United States Patent Office 3,660,521
Patented May 2, 1972

3,660,521
POLYMERIC COMPOUNDS
John Robert Dann, William Frank Fowler, Jr., and Susan Cook Gross, Rochester, N.Y., assignors to Eastman Kodak Company, Rochester, N.Y.
No Drawing. Filed Nov. 28, 1969, Ser. No. 880,896
Int. Cl. C08g 17/08
U.S. Cl. 260—75 S                    15 Claims

ABSTRACT OF THE DISCLOSURE

This invention relates to polymers containing units of thio-substituted polycyclic compounds and to processes of making said polymers. In one aspect, polymers of this invention provide very useful materials for making synthetic plastic lenses having desirable optical properties. In another aspect, these compounds are useful in photographic emulsions.

---

This invention relates to new polymeric compounds. In one aspect, this invention relates to new polymers containing units of thio-substituted polycyclic compounds and more particularly wherein said thio-substituted polycyclic compound contains a thio-substituted bicyclic[2.2.1] group. In another aspect, this invention relates to new polymeric lens compositions.

It is known in the prior art that certain sulfur compounds can be used to cross-link high molecular weight materials, such as rubber latex and various olefins. Moreover, it is known in the art to make polymeric materials containing bridged-ring structures. It is desirable to provide new polymeric compounds having improved physical and chemical properties. Polymeric materials having a high weight percentage of bridged-ring polycyclic groups are especially desirable for making optical lenses. Lenses made from polymeric materials having a high percentage of polycyclic bridged-ring groups provide improved optical properties which cannot be generally obtained with conventional polymeric materials such as poly(methyl methacrylate), polystyrene, etc.

We have now discovered a new class of polymeric compounds which comprise a thio-substituted bicyclic[2.2.1] moiety.

In one preferred embodiment, we have discovered a process for reacting compounds containing bicyclic[2.2.1] moieties having an unsaturated linkage therein with hydrogen sulfide to form a polymeric compound or an intermediate which can be further reacted such as by condensation reactions to form a polymer.

In another preferred embodiment, this invention relates to a process for reacting a mercaptan compound having a condensable group thereon with a polycyclic compound containing a [2.2.1] moiety having an unsaturated linkage therein and wherein said polycyclic compound also contains at least one condensable group thereon.

One general embodiment of this invention relates to a new class of polymeric compounds comprising recurring units having the following formulae:

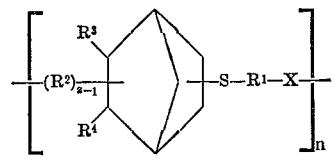

and

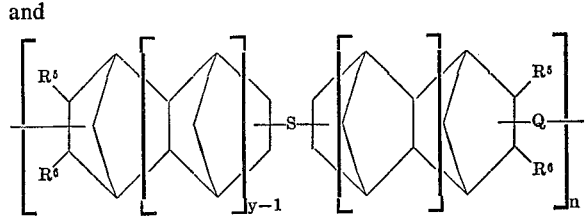

wherein —X— is a carboxylic acid ester linkage such as

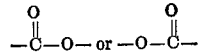

an amide linkage including carbamyl and the like, and a urethane linkage; $R^1$ is an alkylene group having from 1 to 8 carbon atoms such as methylene, ethylene, trimethylene, tetramethylene and the like including branched and substituted alkylene groups such as carboxymethylmethylene and t-butylene; $R^2$ is an alkylene or arylene group having up to 6 carbon atoms not including the substituents thereon and is preferably methylene or a phenylene such as 2-carboxy-5-methyl-1,3-phenylene; $z$ is a positive integer of 1 or 2; $R^3$, $R^4$, $R^5$ and $R^6$ can be hydrogen atoms, alkyl groups having 1–6 carbon atoms, carboxy groups or hydroxyalkyl groups and preferably are hydrogen or hydroxymethyl groups; Q is a linking group containing the residue of two condensable groups such as alkylene esters including substituted alkylene esters and bis alkylene esters, urethanes, amides including alkylene amides and the like; $y$ is an integer of 1 to 4; and $n$ is a positive integer.

In one embodiment, the preferred polymers of the invention are those containing recurring units having structures selected from:

(I)
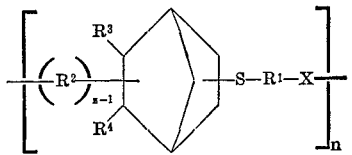

(II)
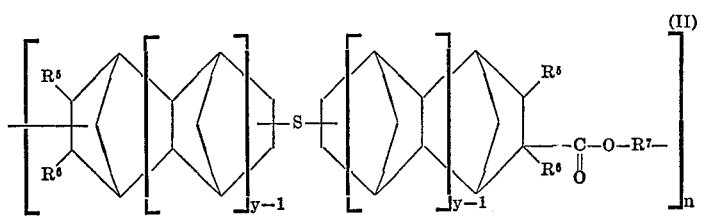

or (III)

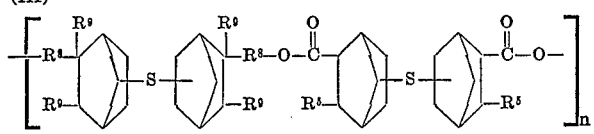

wherein $R^1$–$R^6$, —X—, $y$ and $z$ are as described above; $R^7$ and $R^8$ can each be an alkylene group of 1 to 6 carbon atoms, preferably methylene, and each $R^9$ can be a hydrogen atom, an alkyl group of 1 to 6 carbon atoms, an hydroxyalkyl group of 1 to 6 carbon atoms, and is preferably hydroxymethyl.

In general, the non-cyclic linkages between adjacent cyclic rings contain less than about 6 carbon atoms in the linear chain. The non-cyclic linkages include those linkages comprising a group, such as

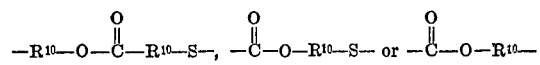

wherein $R^{10}$ is, preferably, methylene, ethylene or a methylene which is optionally substituted with a carboxyl or hydroxyl group (e.g., —CH$_2$COOH, —CH$_2$OH, —COOH, etc.). Long non-cyclic linkages between cyclic groups do not generally provide the requisite physical properties to use the materials as lenses. The polymeric compounds of the invention are clear, hard, glassy substances which provide substantial improvements in thermal and optical properties for lens systems.

In another embodiment, the compounds of the invention provide polymeric lens compositions having indexes of refraction ($n_D^{20}$) of at least 1.50 and dispersion values ($\nu$) of about 50 to about 60 where ($\nu$) is defined as equal to $$\frac{N_{D-1}}{N_F - N_C}$$

where $N_D$=sodium D line, $N_F$=hydrogen F line and $N_C$=hydrogen C line. This improvement in dispersion is quite unexpected since most other polymers which can be easily made have ($\nu$) values below 45.

In another embodiment, this invention relates to polymers represented by structures I, II and III wherein the sulfur atom is oxidized to a sulfone or sulfoxide.

In still another embodiment, this invention relates to new polymers which can be incorporated in photographic compositions to provide highly improved image properties such as, for example, image stability and antifoggant properties as disclosed in our copending application, U.S. Ser. No. 880,895, filed on even date herewith.

The polymers of the invention are generally prepared by reacting an unsaturated bicyclic[2.2.1] compound or a polycyclic compound having bicyclic [2.2.1] groups with sulfur compounds, such as hydrogen sulfide, monofunctional or polyfunctional mercaptans or thioether compounds or intermediates.

In general, polycyclic compounds which can be used in the preparation of the polymers of the invention are those containing an unsaturated bridged-ring group wherein the bridge is a divalent group such as an oxy group (—O—) and is, preferably, a methylene group. Compounds containing bicyclo[2.2.1]-5-heptene substituted with carboxyl, methyl, hydroxymethyl and the like are preferred.

Typical suitable bicyclic compounds useful in the preparation of the polymers of the invention include bicyclo[2.2.1]-3-hydroxymethyl-5-heptene;
5-norbornene-2,3-dicarboxylic acid;
bicyclo[2.2.1]-5-heptene-2,3-dicarboxylic acid anhydride;
bicyclo[2.2.1]-2-methyl-3,3-dihydroxymethyl-5-heptene;
bicyclo[2.2.1]-2-methyl-3,3-dihydroxyethyl-5-heptene;
5-methyl-3-(3-methyl-5-norbornen-2-yl)-1,2,3,6-tetrahydrophthalic anhydride;
and the like.

Unsaturated bridged-ring compounds such as, for example, bicyclo[2.2.1]-5-heptene can be made by reacting a cycloalkadiene with a dienophile (i.e., having at least one double bond) by a reaction commonly referred to as a Diels-Alder reaction, i.e., such as those described in Organic Reactions, vol. IV, chapters I and II, John Wiley and Sons, Inc., New York (1948). The products of Diels-Alder reactions are generally known as Diels-Alder adducts.

The polymeric compounds of structures I–III above can be prepared by reacting sulfur compounds such as hydrogen sulfide or monofunctional or polyfunctional mercaptans or thio-substituted bicyclic compounds with the appropriate Diels-Alder adduct to give the compound of the respective formula. Reaction conditions favoring free radical reactions are preferred. While some reactions are spontaneous and exothermic, other reactions which are difficult to achieve are preferably promoted by the use of free radical catalysts (e.g., ascaridole, peroxides, etc.), ultraviolet light, optionally with photosensitizers such as acetone, benzophenone, and the like, heat, or combinations thereof. Generally, the polymerization reactions for forming polymers useful for optical lenses are controlled to achieve high molecular weights resulting in a polymeric material which is a hard, glassy solid at room temperature.

In the preparation of polymers according to this invention, one preferred process utilizes hydrogen sulfide to react and form a thio linkage between two moieties containing unsaturated bicyclic[2.2.1] groups. Polymers containing a single sulfide linkage between polycyclic groups have been found to be most useful in the production of lens materials. Of course, polyfunctional mono-mercaptans are also very useful wherein at least one of the non-mercaptan functional groups will react in a condensation reaction, i.e., one wherein H$_2$O is a by-product or there is simple ester interchange or transesterification reaction.

This invention is further illustrated by the following examples.

EXAMPLE 1

Preparation of the bisanhydride

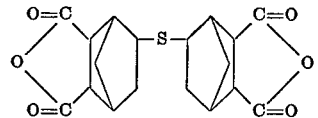

Bicyclo[2.2.1]-5-heptene-2,3-dicarboxylic acid anhydride (nadic anhydride), 73.4 grams (0.45 mole), is dissolved in 550 ml. of dry ethyl acetate in a one-liter Vycor flask equipped with a stirrer, a gas bubbling tube and a gas outlet tube. Hydrogen sulfide is bubbled through the solution for 45 hours while the flask is irradiated with a 275-watt sun lamp placed 1 inch from the exterior surface of the flask. A copious white precipitate of the bisanhydride is formed (63 percent yield) and it is filtered off and washed with ethyl acetate. The product may be recrystallized from dry common solvents, such as ethyl acetate or methylene chloride. Melting point, 300° C.

Analysis.—Calculated for C$_{18}$H$_{18}$SO$_6$ (percent): C, 59.7; H, 5.0; S, 8.8. Found (percent): C, 59.7; H, 5.3; S, 8.6.

EXAMPLE 2

Preparation of the half-ester

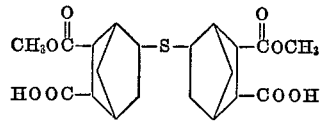

The bisanhydride of Example 1 is heated under reflux with 20 parts of methanol for 24 hours; the excess methanol is then distilled off and the residue is triturated with 3 parts of hot ethyl acetate and filtered. It is washed with 3 more parts of hot ethyl acetate to give the half-ester as a white solid which melts by 180° C., resolidifies and then remelts by 315° C. as the bisanhydride is formed.

Analysis.—Calculated for $C_{20}H_{26}SO_8$ (percent): C, 56.4; H, 6.1; S, 7.52; N.E., 213. Found (percent): C, 56.3; H, 6.3; S, 7.5; N.E., 209.

EXAMPLE 3

Preparation of the tetrabasic acid

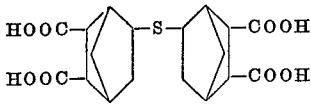

The bisanhydride of Example 1 is hydrolyzed with 4 parts of sodium hydroxide in water and then acidified with dilute hydrochloric acid to give a white precipitate which melts at about 270° C.

Analysis.—Calculated for $C_{18}H_{22}SO_8$ (percent): C, 54.3; H, 5.6; S, 8.0; N.E., 99. Found (percent): C, 52.8; H, 5.7; S, 8.0; N.E., 103.

EXAMPLE 4

Preparation of the dibasic acid

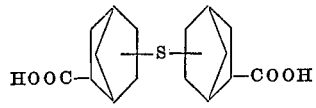

Bicyclo[2.2.1]-5-heptene-2-carboxylic acid, 138 grams (1.0 mole), is dissolved in 500 ml. of ethyl acetate in a one-liter Vycor flask and irradiated and treated with hydrogen sulfide for 49 hours. Evaporation of the solvent gives a quantitative yield of a thick oil. Crystals separating from this oil (5.2 grams) melt at 247° C.

Analysis.—Calculated for $C_{16}H_{22}SO_4$ (percent): C, 62.0; H, 7.2; S, 10.3. Found (percent): C, 61.8; H, 7.3; S, 10.2.

EXAMPLE 5

Preparation of the glycol

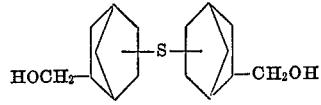

One mole (214 grams) of the adduct of cyclopentadiene and allyl alcohol,

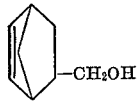

is dissolved in 500 ml. of ethyl acetate in a one-liter Vycor flask equipped with a stirrer, a gas bubbling tube and a gas outlet tube. Hydrogen sulfide is bubbled through the solution for 25 hours while the flask is irradiated with a 275-watt sun lamp placed 1 inch from the exterior surface of the flask. The ethyl acetate is distilled off and the residue is distilled under vacuum to give 106 grams of a colorless, glassy solid boiling at 180° C. at 8μ.

Analysis.—Calculated for $C_{16}H_{26}SO_2$ (percent): C, 68.1; H, 9.3; S, 11.3. Found (percent): C, 68.2; H, 9.5; S, 11.7.

The exemplary structures of the following examples which are believed representative of the compound forms are illustrated in Table 1.

EXAMPLE 6

Preparation of Sample 1

Equimolar amounts of 2-mercaptoethanol and 5-norbornene-2,3-dicarboxylic acid are mixed at room temperature. When the initial exothermic reaction has subsided, the reaction mixture is heated first in an oil bath with a free-radical catalyst, then refluxed in ethanol. A clear, hard, glassy polymer is formed on removal of the solvent.

Analysis.—Calculated for $C_{22}H_{30}S_2O_9$ (percent): C, 52.6; H, 6.0; S, 12.8. Found (percent): C, 52.4; H, 6.0; S, 12.5.

EXAMPLE 7

Preparation of Sample 2

Equimolar amounts of mercaptoacetic acid and bicyclo[2.2.1]-2-methyl - 3,3 - dihydroxymethyl-5-heptane are mixed at room temperature in an inert atmosphere of $N_2$. When the initial exothermic reaction has subsided, a small amount (2–4 drops) of ascaridole is added. An additional rise in temperature occurs. The reaction mixture is heated for several hours under $\geq 1$ mm. Hg, with the addition of an esterification catalyst. When cooled to room temperature, a hard, clear glassy solid is formed.

Analysis.—Calculated for $C_{12}H_{18}SO_3$ (percent): C, 59.5; H, 7.5; S, 13.2. Found (percent): C, 58.0; H, 7.7; S, 13.4.

EXAMPLE 8

Preparation of Sample 3

Equimolar amounts of 3-mercaptopropionic acid and bicyclo[2.2.1]-2-methyl - 3,3 - dihydroxymethyl-5-heptene are allowed to react under the conditions described in Example 7. The reaction is exothermic and on completion forms a hard, glassy, clear solid.

Analysis.—Calculated for $C_{13}H_{20}SO_3$ (percent). C, 61.0; H, 7.8; S, 12.5. Found (percent), C, 60.3; H, 8.1; S, 11.5.

EXAMPLE 9

Preparation of Sample 4

Equimolar amounts of 4-mercapto butyric acid and bicyclo[2.2.1]-2-methyl - 3,3 - dihydroxymethyl-5-heptene are allowed to react under the conditions described in Example 7. The reaction is exothermic and on completion forms a hard, glassy solid.

EXAMPLE 10

Preparation of Sample 5

Equimolar amounts of mercaptosuccinic acid and bicyclo-[2.2.1]-2-methyl - 3,3 - dihydroxymethyl-5-heptene are allowed to react under the conditions described in Example 7. The solid reagents are heated above their melting points to form a clear melt. On completion of the reaction and cooling to room temperature, a hard, glassy solid forms.

Analysis.—Calculated for $C_{14}H_{20}SO_5$ (percent): C, 56.0; H, 6.67; S, 10.65. Found (percent): C, 55.2; H, 6.7; S, 10.7.

EXAMPLE 11

Preparation of Sample 6

Equimolar amounts of mercaptosuccinic acid and bicyclo[2.2.1]-3-hydroxymethyl-5-heptene are allowed to react under the conditions described in Example 7. The reaction is exothermic and on completion forms a hard, clear, glassy solid.

EXAMPLE 12

Preparation of Sample 7

Equimolar amounts of 5-methyl-3-(3-methyl - 5 - norbornen - 2-yl - 1,2,3,6 - tetrahydrophthalic anhydride and 2-mercaptoethanol are heated together in the presence of a free radical-forming catalyst such as ascaridole to give a clear, glassy solid.

Analysis.—Calculated for $C_{19}H_{24}SO_3$ (percent): C, 68.7; H, 7.3; S, 9.6. Found (percent): C, 64.9; H, 7.7; S, 8.7.

EXAMPLE 13

Preparation of Sample 8

Sixty-eight grams (0.25 mole) of 2-methylnorborn-5-en-3-ylmethyl, 2-methylnorborn-5-en-3-carboxylate and 0.375 gram (0.00206 mole) of benzophenone are dissolved in 375 ml. of cyclohexane in a 500-ml. quartz flask equipped with a magnetic stirrer, a sintered glass bubbling tube and an outlet tube. The reaction mixture is stirred while hydrogen sulfide gas is bubbled through the solution, and the flask is irradiated with a G.E. 275-watt Sun Lamp 1 inch from the outer surface of the flask. After 70 hours, the hot solution (68° C.) is allowed to cool and an insoluble oil settles out. This is taken up in 100 ml. of ethyl acetate, precipitated in 700 ml. of ethyl alcohol, taken up in 200 ml. of methylene chloride, precipitated in 600 ml. of acetone twice and then dried in a vacuum oven at 117° C. for 1 hour to give 50 grams of brittle glassy polymer (65 percent).

EXAMPLE 14

Preparation of Sample 9

To 5 grams (0.0163 mole) of the polymer of Example 13 in 100 ml. of glacial acetic acid is added 11.5 ml. of 32 percent hydrogen peroxide solution. The mixture is stirred for 1 hour at 50° C. and then poured into 900 ml. of cold water to give a quantitative yield of the polymeric sulfone.

EXAMPLE 15

Preparation of Sample 10

Sixty-one grams (0.25 mole) of 5-norboren-2-ylmethyl, 5-norbornene-2-carboxylate and 0.375 gram ($2.06 \times 10^{-3}$ moles) of benzophenone are allowed to react with hydrogen sulfide in a similar manner as in Example 13 to give 49 g. (70.5 percent) of glassy polymer. The bis-adduct is prepared either by the Tischenko reaction of the bicyclo[2.2.1]cyclohepta-5-ene-2-carboxaldehyde or by the esterification of bicyclo[2.2.1]cyclohepta-5-ene-2-carboxylic acid with 2-hydroxymethyl-bicyclo[2.2.1]cyclohepta-5-ene.

EXAMPLE 16

Preparation of Sample 11

The bisanhydride of Example 1, 9.05 grams (0.025 mole), and the glycol of Example 5, 7.06 grams (0.025 mole), are heated in a 250-ml. flask in an oil bath at 210° C. for 5½ hours to give a white resin which is washed with hot ethyl acetate, then methylene chloride, and finally acetone.

EXAMPLE 17

Preparation of Sample 12

The dibasic acid of Example 4, 2.76 grams (0.0089 mole), and the glycol of Example 5, 2.51 grams (0.0089 mole), are mixed in a 50-ml. flask with a few grains of dibutyltin oxide and heated in an oil bath to 210° C. at atmospheric pressure for 3 hours and then at 1 mm. and 225° C. for 6 hours to give a clear glass on cooling.

EXAMPLE 18

Preparation of the polymer

The polynuclear bis-adduct 1,2,3,4,4a,5,8,8a,9,9a,10,10a-dodecahydro - 1,4:5,8:9,10 - trimethano-2-methylanthr-3-ylmethyl, 1,2,3,4,4a,5,5a,6,6a,7,10,10a,11,11a,12,12a-hexadecahydro - 2 - methyl 1,4:5,12:6,11:7,10-tetramethano-3-naphthacenecarboxylate (37.5 grams, 0.0625 mole) in 375 ml. of cyclohexane containing 0.375 gram (0.00206 mole) of benzophenone is irradiated and treated with hydrogen sulfide, as in Example 13, for 64 hours to give an insoluble powder (22 grams, 55 percent) which melts at around 300° C.

EXAMPLE 19

Physical properties (e.g., refractive index at 20° C. ($n_D^{20}$), dispersion ($\nu$), glass transition temperature ($T_g$) of various polymeric lens compositions are set forth in Table 1 below.

TABLE 1.—PROPERTIES OF POLYMERIC LENS COMPOSITIONS

| Sample Number | Polymeric compound | $Tg$, ° C. | $n_D^{20}$ | $\nu$ |
|---|---|---|---|---|
| 1 | [structure] | 86.5 | 1.5593 | 50.8 |
| 2 | [structure] | 36 | 1.5611 | 51.5 |
| 3 | [structure] | 40 | 1.5603 | 49.7 |
| 4 | [structure] | ---- | 1.5523 | 43.5 |
| 5 | [structure] | 101 | 1.5538 | 49.8 |

TABLE—Continued

| Sample Number | Polymeric compound | $T_g$, °C. | $n_D^{20}$ | $v$ |
|---|---|---|---|---|
| 6 | [structure] | 75 | 1.5464 | 54.6 |
| 7 | [structure] | 93 | 1.5535 | 40.7 |
| 8 | [structure] | 121 | 1.5453 | 55.2 |
| 9 | [structure] | ---- | 1.5271 | 60.6 |
| 10 | [structure] | 110 | 1.5558 | 50.6 |
| 11 | [structure] | 26 | 1.5465 | 48.2 |
| 12 | [structure] | 102 | 1.5614 | 58.0 |

The polymeric lens compositions herein disclosed have improved optical and thermal properties compared to polystyrene and poly(methyl methacrylate). They can be compression-molded at 300° F. and 10,000 p.s.i. The lens compositions have about the same scratch hardness as polystyrene.

EXAMPLE 20

Samples 1, 6, 8, 10 and 12 are molded into negative lens elements and tested in a triplet system as described in Altman, U.S. Pat. 3,194,116, issued July 13, 1965. In every instance, better image properties are obtained than a similar system using an acrylonitrile-styrene negative lens.

Although the invention has been described in considerable detail with particular reference to certain preferred embodiments thereof, variations and modifications can be effected within the spirit and scope of the invention.

We claim:

1. A moldable polymeric compound consisting essentially of recurring units having the formula:

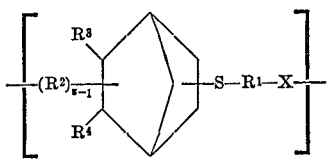

or

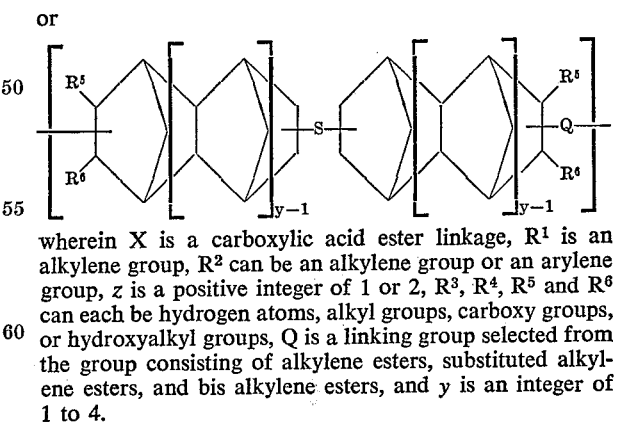

wherein X is a carboxylic acid ester linkage, $R^1$ is an alkylene group, $R^2$ can be an alkylene group or an arylene group, $z$ is a positive integer of 1 or 2, $R^3$, $R^4$, $R^5$ and $R^6$ can each be hydrogen atoms, alkyl groups, carboxy groups, or hydroxyalkyl groups, Q is a linking group selected from the group consisting of alkylene esters, substituted alkylene esters, and bis alkylene esters, and $y$ is an integer of 1 to 4.

2. A polymer according to claim 1 wherein the non-cyclic linkages between cyclic rings in the depicted formula contain less than about 6 carbon atoms.

3. A polymer according to claim 1 which comprises units of the formula:

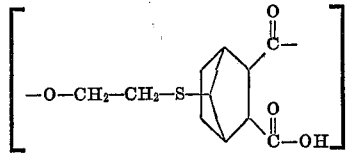

4. A polymer according to claim 1 comprising units having the formula:

(II)

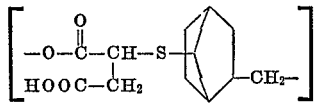

5. A polymer according to claim 1 comprising units having the formula:

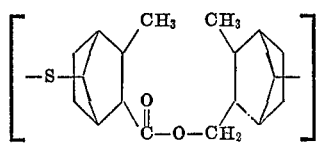

6. A polymer according to claim 1 comprising units having the formula:

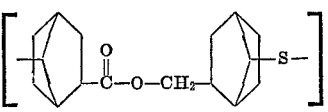

7. A polymer according to claim 1 comprising units having the formula:

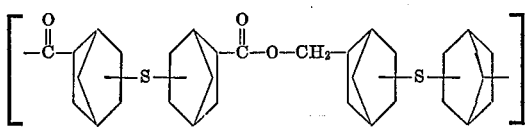

8. A polymer according to claim 1 which has a $n_D^{20}$ of at least 1.50.

9. A polymer according to laim 1 which has a dispersion value between 50 and 60.

10. A polymer according to claim 1 wherein the sulfur atoms in the depicted units have been oxidized to a sulfone.

11. A polymer according to claim 1 wherein the sulfur atoms in the depicted unit have been oxidized to a sulfoxide.

12. A moldable polymer consisting essentially of recurring units of the formula:

(I)

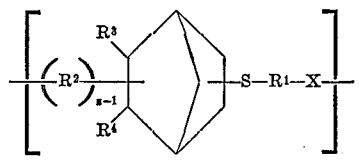

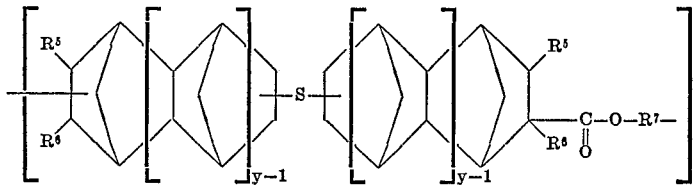

or (III)

wherein X is a carboxylic acid ester linkage, $R^1$ is an alkylene group, $R^2$ can be an alkylene group or an arylene group, $z$ is a positive integer of 1 or 2, $R^3$, $R^4$, $R^5$ and $R^6$ can each be hydrogen atoms, alkyl groups, carboxy groups, or hydroxylalkyl groups $y$ is an integer of 1 to 4, $R^7$ and $R^8$ are each an alkylene group of 1 to 6 carbon atoms and each $R^9$ is a hydrogen atom, an alkyl group or a hydroxyalkyl group.

13. A polymer according to claim 12 wherein $R^7$ and $R^8$ are methylene groups.

14. An optical lens made of the moldable polymer of claim 1.

15. A process of forming a moldable polymer comprising reacting to form a polyester (1) a polycyclic compound comprising an unsaturated [2.2.1] bicyclic moiety and at least one condensable group thereon with (2) a mono mercaptan compound which comprises at least one other condensable group thereon.

References Cited

UNITED STATES PATENTS 3,213,061   10/1965   Caldwell et al. _____ 260—47

MELVIN GOLDSTEIN, Primary Examiner

U.S. Cl. X.R.

260—77.5 AP, 78 R